Dec. 14, 1926.
M. REYNHOUT
WINDSHIELD CLEANER
Filed Dec. 26, 1922    2 Sheets-Sheet 1
1,611,073
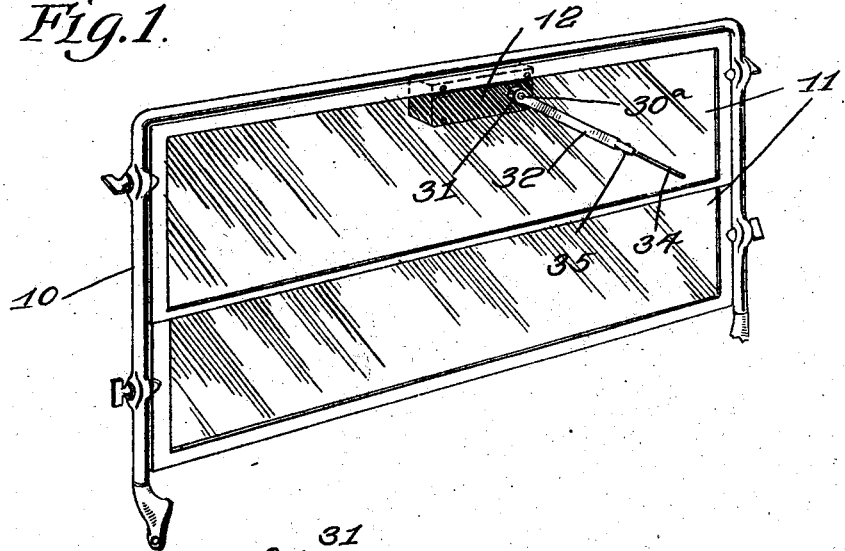
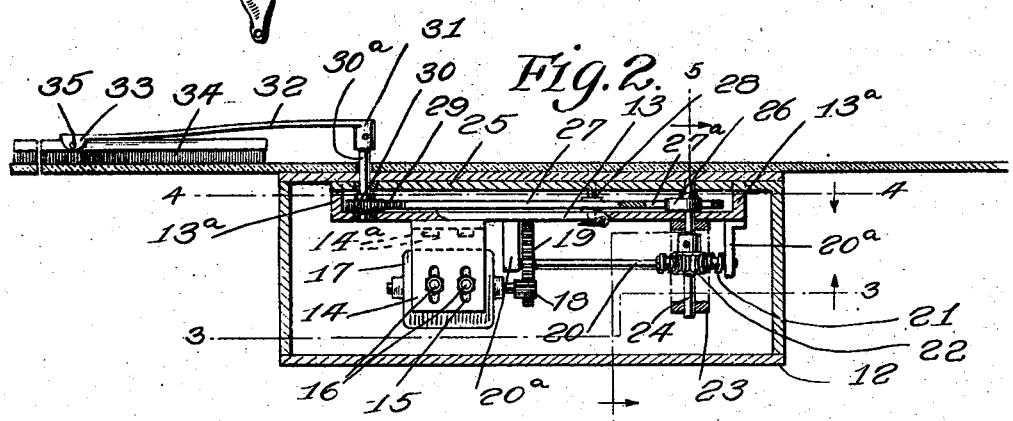
Inventor
Morten Reynhout.
By Milo B. Stevens & Co.
Attorney Dec. 14, 1926. 1,611,073
M. REYNHOUT
WINDSHIELD CLEANER
Filed Dec. 26, 1922    2 Sheets-Sheet 2
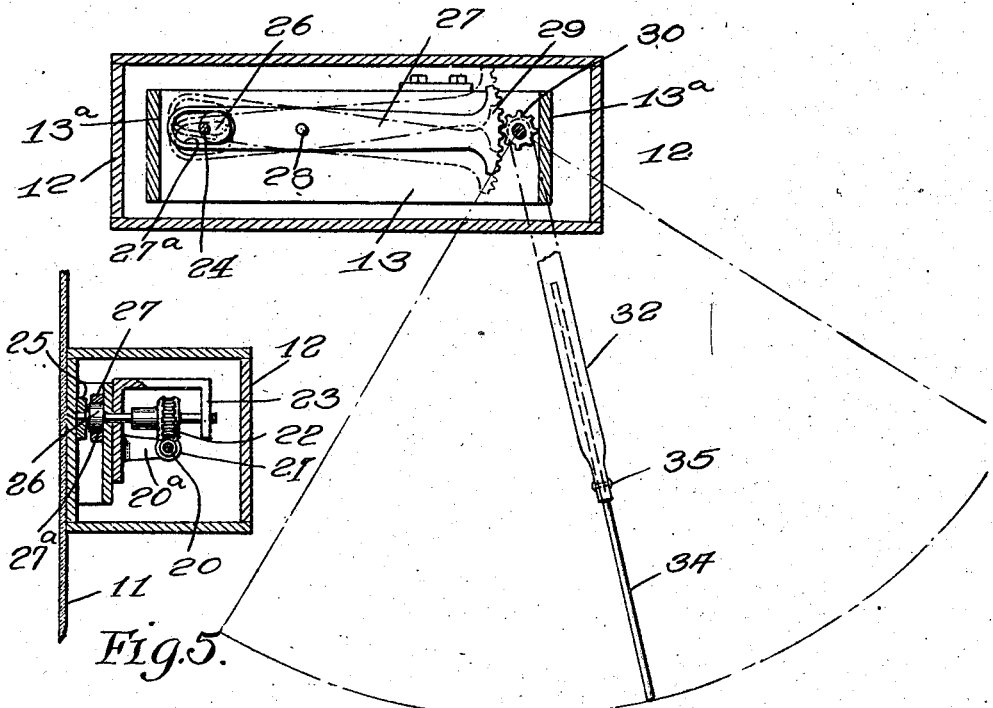
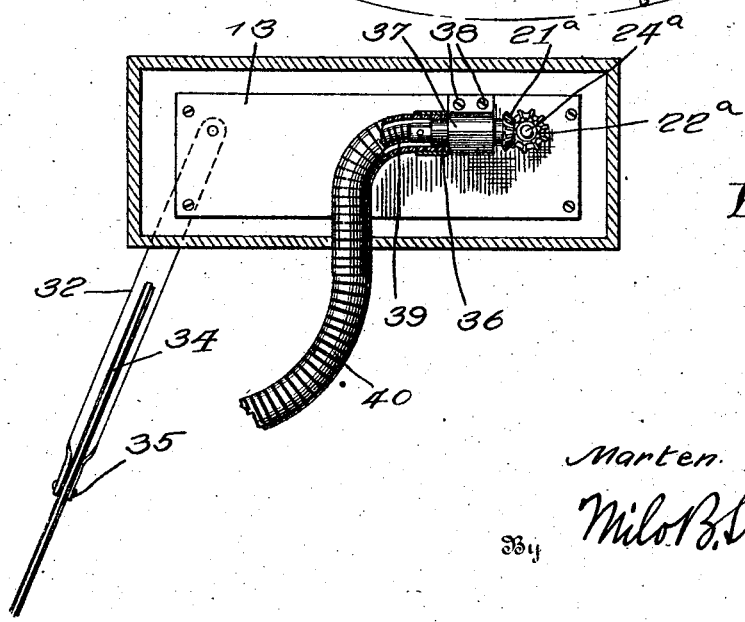
Inventor
Marten Reynhout
By Milo B. Stevens Co.
Attorney Patented Dec. 14, 1926.

1,611,073

UNITED STATES PATENT OFFICE.

MARTEN REYNHOUT, OF CHICAGO, ILLINOIS.

WINDSHIELD CLEANER.

Application filed December 26, 1922. Serial No. 608,972.

My invention relates to improvements in windshield wipers for motor vehicles and more particularly to those of the power operated variety, the invention having for its primary object the provision of a novel and improved device of this kind which is positive in operation and will remove heavy accumulations of snow and ice which obstruct the driver's view.

A further object of the invention is to provide a windshield wiper of the character set forth which is simple in construction, strong and durable, and which may be manufactured and sold at a relatively small cost.

The above and other objects are obtained by means of a novel combination and arrangement of parts to be hereinafter described and claimed, and in order that the same may be better understood, reference is had to the accompanying drawings, forming a part of this specification, wherein, Figure 1 is a perspective view of a windshield of conventional design illustrating the application of my invention thereto;

Fig. 2 is a central longitudinal section through the device and a portion of the windshield glass;

Fig. 3 is a section on the line 3—3 of Fig. 2;

Fig. 4 is a section on the line 4—4 of Fig. 2;

Fig. 5 is a section on the line 5—5 of Fig. 2, and

Fig. 6 is a view similar to Fig. 3 illustrating a modified form of the invention.

Referring specifically to the drawing, wherein like reference characters designate like parts throughout the several views, numeral 10 denotes a windshield of the usual construction comprising two pivoted ventilating sections 11, to the top frame of the upper of which is attached a housing 12, this latter being secured by means of screws or other fasteners passing through the frame and windshield glass.

Referring now to Figures 2 and 3 showing the interior arrangement of the housing 12 it will be noted that a plate 13 is secured by means of its laterally directed ends 13$^a$ to the front wall of the housing in any preferred manner, the plate 13 being spaced therefrom as clearly shown in Figure 2 for a purpose that will presently appear. Secured to the outer surface of this plate 13 is an angle plate 14, its fastening means in the form of machine screws 14$^a$ being shown dotted in Figure 2. The laterally projecting portion of the angle plate 14 is provided with a pair of spaced longitudinal slots 15 for the reception of threaded studs 16 projecting upwardly therethrough from the field casing of a small electric motor 17, which is firmly secured to the under surface of the laterally projecting portion of the angle plate by means of nuts, screwed upon the threaded ends of the studs 16.

The motor 17 is provided at the end of its armature shaft with a small pinion 18 for meshing engagement with a gear 19 journaled in bearings 20$^a$ carried by the outer face of the plate 13, the shaft 20 of said gear 19 being provided at its remote end with a worm gear 21. In driving engagement with the worm gear 21 is a gear 22 arranged thereabove and journaled transversely through the plate 13 at its inner end and in the depending portion of a bracket 23 at its outer end, this bracket being carried by the outer face of the plate 13. The shaft 24 of the last mentioned gear 22 extends through the plate 13 its end being received in a longitudinal keeper bar 25 which seats against the front wall of the housing being received in recesses in the ends of the plate 13.

Upon the shaft 24 in the space between the keeper bar 25 and the plate 13 is rigidly secured a cam 26, which latter is adapted to work in a longitudinal recess 27$^a$ of a pitman 27 which is pivoted between the plate 13 and the keeper bar 25 as shown at 28, the free end of said pitman being provided with rack teeth 29 as best illustrated in Figure 4. The rack teeth 29 engage with a pinion 30 which is also journaled between the plate 13 and the keeper bar 25 as illustrated in Figure 2, wherein the shaft 30$^a$ of said pinion 30 is shown projecting through the front wall of the housing 10 and the windshield glass to receive a socket 31, which latter is rigidly secured thereon in any preferred manner as by means of a set screw for instance. The socket 31 carries a lateral and rearwardly bent resilient arm 32 of spring metal, the free end of which is formed with opposed ears 33, which form a U-shaped socket to receive the upper edge of a wiping element 34, a pivotal connection being had by means of the transverse stud 35.

In operation it will be evident that when the motor 17 is started a rotary movement will be imparted to the cam 26 through the medium of gears 19, 21, and 22, this operation resulting in the rocking of the pitman in a vertical direction as shown in Figure 4. Through the medium of pinion 30 the arm 32 will be reciprocated, its resiliency tending to maintain the wiping element 34 pressed against the outside of the glass at all times for removing accumulations therefrom. By using the pivotal connection 35, this connection being at the central part of the wiping element it will be clear that the entire wiping surface thereof will at all times be pressed against the glass.

In Figure 6 I have illustrated a slightly modified form of the invention embodying a driving element which may be driven from some moving part of the vehicle. In this instance I have shown the plate 13 as usual but the gear 22 has been replaced by the beveled gear 22ª and the motor 17 with its driving connection has been replaced by the collar 37 which is fastened to the plate 13 by means of screws 38. This collar 37 forms a bearing for a short shaft 36 carrying a bevel gear 21ª in mesh with gear 22ª. A driving connection may be had between a moving part of the vehicle and the shaft 36 by means of a flexible driving means 39 carried within a flexible shaft 40. The cam 26 is carried upon the shaft 24 as usual and the rest of the mechanism operates as previously described.

From the foregoing description, read in connection with the accompanying drawings, the novel features and advantages of my construction will be readily appreciated by those skilled in the art. The spaced plates 13 and 25 constitute the support for the elements in direct cooperation with the shaft 30ª of the wiper, and form in addition a protective housing therefor,—also serving to isolate the driving means from the driven elements 26, 27 and 30. It will thus be seen that the driving means may be removed without interfering with the other elements or necessitating dismantling of the device. Likewise the driving means of Fig. 5 can be substituted for that of Figs. 2 and 3 with equal facility.

The direct alinement of the pitman 27 with the cam 26 and the gear 30 with which elements it is engaged, together with the adjacent and opposite journalling of all, insures extreme rigidity, a minimum of friction and wear with accompanying long life of the bearing surfaces and silent operation.

The illustrated embodiment of the invention is especially adapted for rapid production since the plates 13 and 25 together with the pitman 27 may be produced from flat steel stock by use of the punch press after which they may be heat treated. The shaft 24 with the integral eccentric 26 constitutes a very simple screw-machine problem. The other elements may likewise be made very readily from either stampings or castings.

Fig. 2 illustrates that the plates 13 and 25 cooperate with the spindle shaft gear 30 and the cam 26 so as to prevent lateral displacement of the same together with their shafts.

While I have described the preferred embodiment of my invention as required by the patent statutes, yet it will be understood that I do not propose to be limited strictly thereto since various changes and modifications thereof will immediately suggest themselves to those skilled in the art within the spirit of my invention, the scope of which is defined by the following claim.

Having thus described my invention, what I claim as new and desire to secure by Letters Patent is.

A driving mechanism for oscillatory windshield wipers including a pair of spaced and rigidly connected plates constituting a support through which the wiper arm spindle is journalled, a gear keyed upon said spindle shaft, the aforementioned plates being so spaced as to cooperate with the hub portion of said gear to prevent lateral movement of said shaft; an oscillatory arm journalled between said spaced plates, rack teeth formed at one end of said arm cooperable with said wiper arm spindle gear for oscillating said wiper arm; a driven shaft journalled in said spaced plates and projecting beyond the outer face of one of the same, driving means associated with the projecting end of said driven shaft; a radial projection carried upon said driven shaft intermediate said plates, said radial projection having an operative connection with said oscillatory arm whereby an oscillatory motion is imparted thereto when said shaft is in motion; and the spaced plates cooperating with said radial projection to prevent lateral movement of said driven shaft.

In testimony whereof I affix my signature.

MARTEN REYNHOUT.